(12) United States Patent
Miller et al.

(10) Patent No.: US 10,458,790 B2
(45) Date of Patent: Oct. 29, 2019

(54) SPACE DETERMINING DEVICE AND SYSTEM AND METHOD FOR CAPTURING DIMENSIONS AND MOUNTING OBJECTS

(71) Applicant: C&B Products LLC, McHenry, IL (US)

(72) Inventors: Charles E. Miller, McHenry, IL (US); Brian Blasey, Hawthorn Woods, IL (US)

(73) Assignee: C&B Products LLC, McHenry, IL (US)

( * ) Notice: Subject to any disclaimer, the term of this patent is extended or adjusted under 35 U.S.C. 154(b) by 161 days.

(21) Appl. No.: 15/829,124

(22) Filed: Dec. 1, 2017

(65) Prior Publication Data

US 2018/0156612 A1    Jun. 7, 2018

Related U.S. Application Data

(60) Provisional application No. 62/428,580, filed on Dec. 1, 2016.

(51) Int. Cl.
| | |
|---|---|
| *A47G 1/24* | (2006.01) |
| *G01C 9/02* | (2006.01) |
| *G01B 3/08* | (2006.01) |
| *A47G 1/20* | (2006.01) |

(52) U.S. Cl.
CPC ............ *G01C 9/02* (2013.01); *A47G 1/205* (2013.01); *A47G 1/24* (2013.01); *G01B 3/08* (2013.01)

(58) Field of Classification Search
CPC ............ A47G 1/24; A47G 1/205; G01B 3/08
USPC ............. 33/613, 520, 644, 607, 673, 675
See application file for complete search history.

(56) References Cited

U.S. PATENT DOCUMENTS

| | | | |
|---|---|---|---|
| 452,019 A | 5/1891 | Pedersen | |
| 794,170 A | 7/1905 | Fessler | |
| 1,274,647 A | 8/1918 | Whipple | |
| 1,398,871 A | 11/1921 | Livingston | |
| 1,539,700 A * | 5/1925 | Stramaglia | B25D 5/00 33/675 |
| 2,599,819 A | 3/1950 | Fisher | |

(Continued)

OTHER PUBLICATIONS https://www.hangomatic.com.
https://www.amazon.com/Picture-Hanging-Tool-Perfect-Simple/dp/B005Z2700Q/ref=sr_1_3?ie=UTF8&qid=1511904654&sr=8-3&keywords=perfect+picture+hanger.

*Primary Examiner* — Christopher W Fulton
(74) *Attorney, Agent, or Firm* — Stephen T. Scherrer; Monique A. Morneault; Scherrer Patent & Trademark Law, P.C.

(57) ABSTRACT

The present disclosure relates to a space and dimension determining device, which is useful for placement, mounting, hanging and leveling a picture, shelving, or any other object onto a receiving surface. The present device is capable of locking into position capturing the dimensions and allowing for "measureless" transfer of dimensions from one place to another. The present disclosure further relates to a device incorporating a laser, either as part of, or a separate, attachable feature to, the present device, the laser being useful for assisting in determining center points, and a plurality of dimensions and readings equal distance from the center point. The present disclosure also relates to a system and method of transferring dimensions from a space determining device to an electronic communication device, which is used to create a template for placement of an item or items within a target space.

18 Claims, 6 Drawing Sheets

(56) References Cited

U.S. PATENT DOCUMENTS

| | | | | |
|---|---|---|---|---|
| 2,816,366 | A | * | 12/1957 | Barlow .................... B25D 5/02 160/126 |
| 2,842,860 | A | | 7/1958 | Gray |
| 3,025,609 | A | * | 3/1962 | Hendrix ................... B25H 7/00 33/44 |
| 3,026,624 | A | * | 3/1962 | Clay ........................ B25H 7/00 33/27.033 |
| 3,137,947 | A | | 6/1964 | Burl |
| 3,345,755 | A | * | 10/1967 | Ferebee ................... B25D 5/02 33/675 |
| 3,583,823 | A | | 6/1971 | Eaton et al. |
| 3,628,253 | A | | 11/1971 | Shepard |
| 4,981,400 | A | * | 1/1991 | Stover .................... B23B 47/287 33/667 |
| 5,062,747 | A | * | 11/1991 | Chen ..................... B23B 47/287 33/675 |
| 5,103,573 | A | | 4/1992 | Ehling et al. |
| 5,647,139 | A | | 7/1997 | Richardson |
| 6,158,137 | A | | 12/2000 | Bramlett |
| 6,421,928 | B1 | | 7/2002 | Miller |
| 6,473,983 | B1 | | 11/2002 | Gier |
| 6,785,977 | B1 | | 9/2004 | Crichton |
| 8,286,363 | B1 | | 10/2012 | Martinez |
| 8,840,080 | B1 | | 9/2014 | Gordon |
| 9,067,314 | B2 | | 6/2015 | Frazer |
| 9,709,393 | B2 | * | 7/2017 | Oppenheim ........... G01C 15/02 |
| 2004/0211074 | A1 | * | 10/2004 | Tessel ..................... B44D 3/38 33/414 |
| 2006/0101661 | A1 | * | 5/2006 | Schmidt ................. A47G 1/205 33/613 |
| 2016/0040971 | A1 | * | 2/2016 | Hoge ................... G01B 3/1084 33/701 |
| 2017/0027341 | A1 | * | 2/2017 | Frazier, Jr. ............... G01C 9/34 |

* cited by examiner

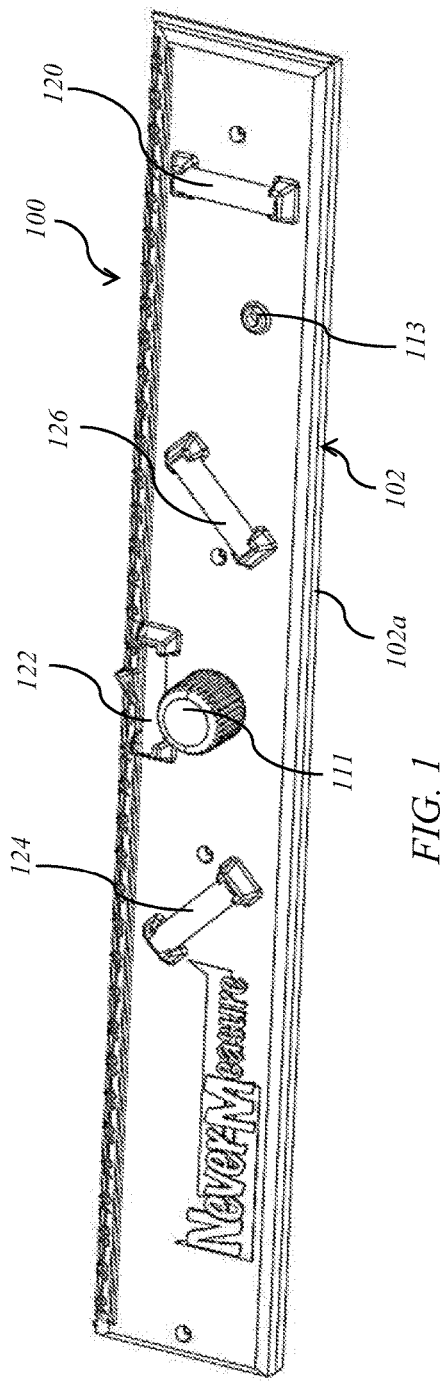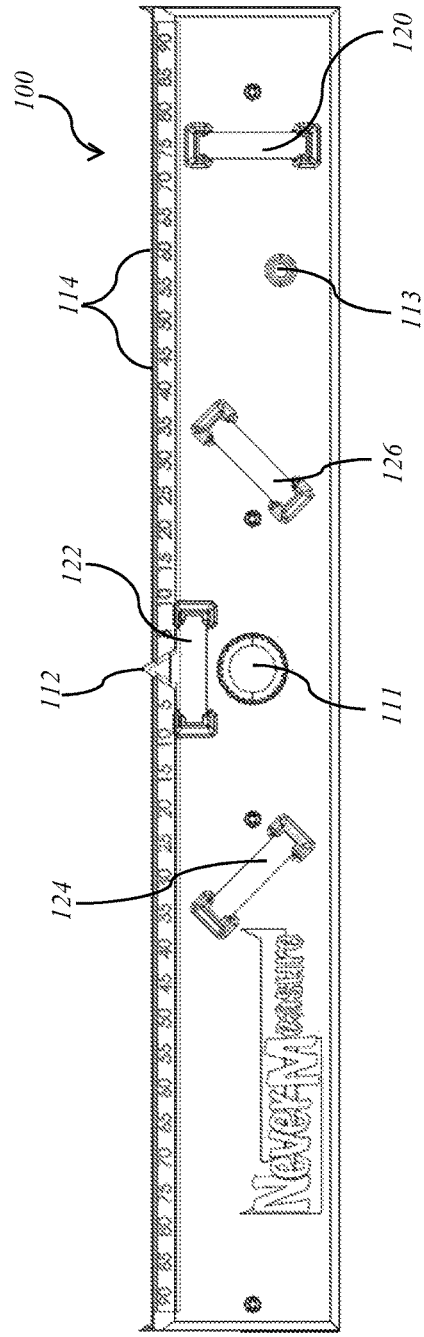

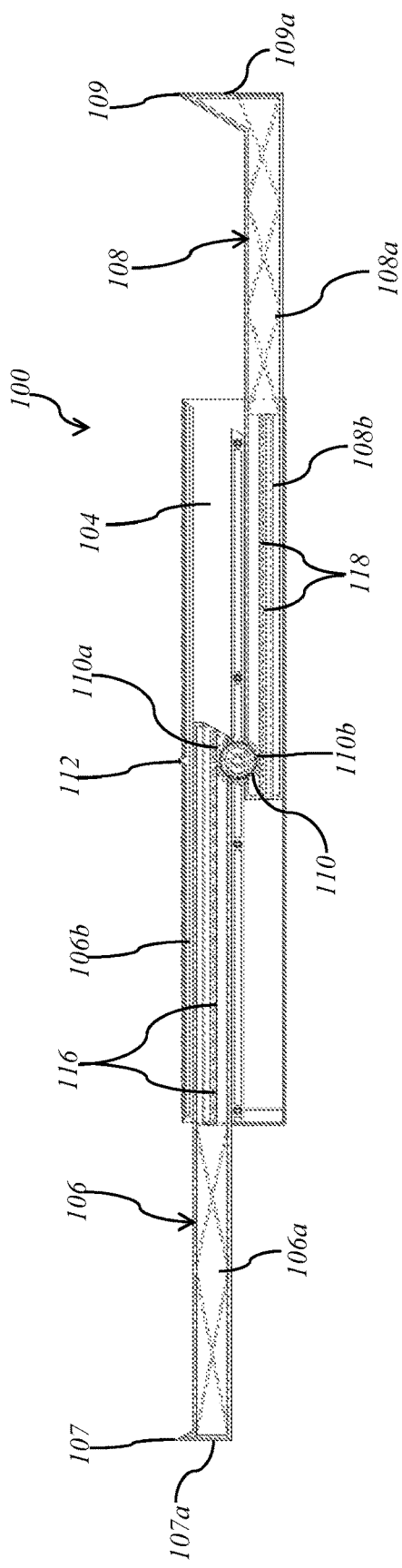
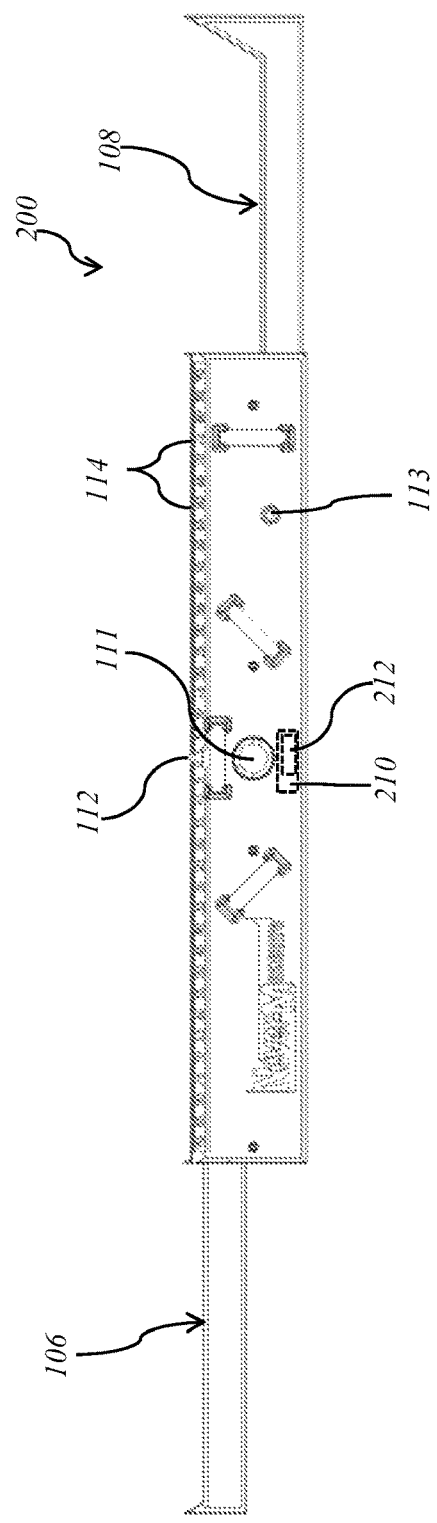
FIG. 4
FIG. 5

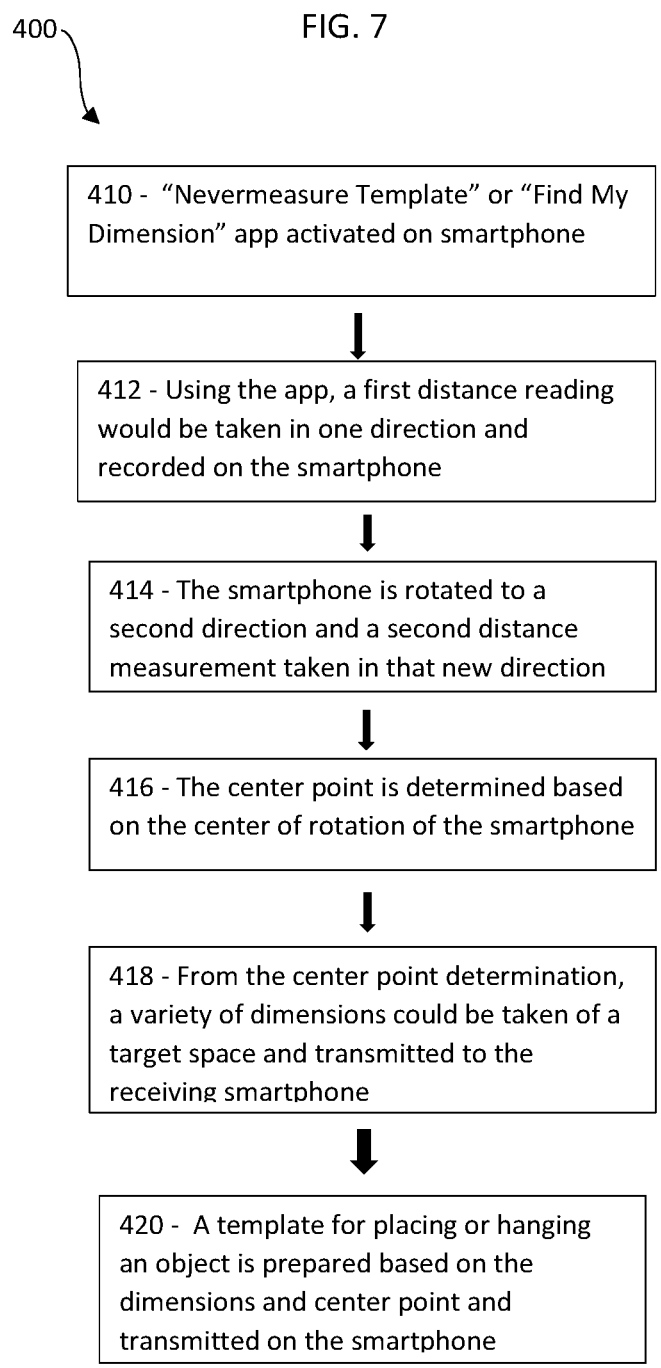

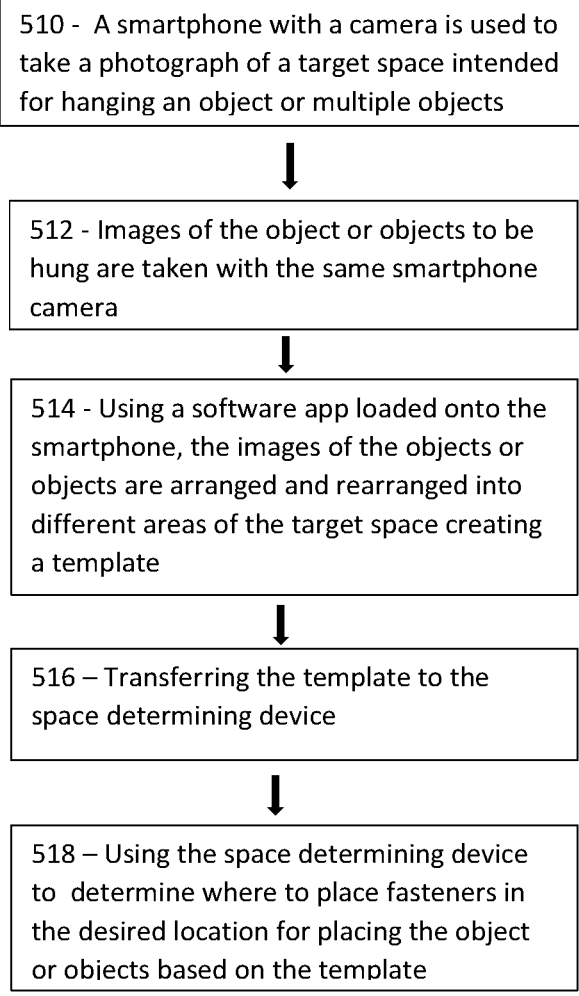

SPACE DETERMINING DEVICE AND SYSTEM AND METHOD FOR CAPTURING DIMENSIONS AND MOUNTING OBJECTS

This application claims priority to U.S. Provisional Application Ser. No. 62/428,580 filed Dec. 1, 2016, which is incorporated in its entirety herein.

TECHNICAL FIELD

The present disclosure relates to a spacing and leveling device for use in the "measureless" transfer of spacing and mounting objects, as well as, a system and method for determining spacing, capturing and transferring dimensions. More particularly, the present device is useful for the easy location of blind hole placement from a center point, which is useful for hanging objects, such as shelving and artwork. The present device is also useful in determining dimensions, such as a width and length of a particular space, including the inside of a drawer or cabinet.

The present disclosure further relates to a device incorporating a laser, either as part of, or a separate, attachable feature to, the present device, the laser being useful for assisting in determining center points, and a plurality of dimensions and readings equal distance from the center point.

The present disclosure also relates to a system and method of transferring dimensions from a space determining device to an electronic communication device, for example, a laptop computer, smartphone, tablet, or other device, which is loaded with a software application useful for creating a template based on captured dimensions for placement of an item or items within a target space.

BACKGROUND

It is, of course, generally known to use some form of a measuring device, typically a tape measure or ruler in conjunction with a level, when positioning pictures, shelves, artwork or other hanging items or decorative objects that require level hanging for aesthetic and/or functional purposes. However, these tools can be tricky to use, awkward to read, and difficult to use in hard-to-reach places. Further, it is often difficult for an individual to accurately determine the center point and accurate spacing from that center point for hanging an item or a collection of items. Numerous attempts at determining the center point and accurate spacing, combined with repeated attempts to hang an item, and the multiple tools required for the project, can make hanging an item a tedious process.

The result of numerous attempts to properly hang an object can result in multiple undesirable markings on a wall, for example, in an effort to get the desired height and location to hang the object. This "trial and error method" may result in multiple nail holes or other markings requiring additional repair or patching of the receiving surface or wall. Additionally, should the task become too tedious the result may be improperly placed, and unaesthetically pleasing.

Additionally, it can be difficult for an individual to attempt to accurately measure and hang an item by him or herself. Handling a flexible measuring tape can be cumbersome, and trying to obtain accurate spacing from a center point and marking the receiving wall can be difficult, potentially requiring several attempts at re-measurement for accuracy. Finally, a second tool, such as a level, is generally required to ensure the hung item is in the proper position.

A need, therefore, exists for an improved space determining device and system for locating the proper spacing for hanging an item or object. Specifically, a need exists for an improved, all-in-one device that permits the user to quickly and easily determine accurate spacing for hanging an item or object, whether for initially hanging an item, or hanging an item in relation to other previously-hung item or items.

Moreover, a need exists for an improved space determining device and system for easily locating a center point for hanging or mounting an item.

A need further exists for an improved space determining device and system for determining a location for placing an item in relation to the center point.

A need further exists for an improved space determining device that determines and locks onto a desired dimension thereby holding the dimensions, so that the dimensions can be transferred from one area or item to another area or item.

Additionally, a need exists for an improved space determining device for determining whether an item is properly placed in a level position, as well as, at various angles.

A need further exists for an improved space determining device and system useful for determining blind hole placement for hanging an item.

A need further exists for an improved space determining device that can be stored in a compact manner.

A need further exists for a system and method of transferring dimensions from a space determining device to an electronic communication device, having a software application useful for creating a template based on captured dimensions for placement of an item or items within a target space.

SUMMARY

The present disclosure relates to a device, system and method for determining precise measuring, leveling and placement. Specifically, the present all-in-one device is useful for determining proper placement including centering, spacing and leveling of an item or object. The present device and system are also useful for determining dimensions from a target space, an item, template or a project, and transferring those dimensions to where an item may be placed or hung, or where markings may be made for placing an item, or onto a template, etc. The present device is also useful for determining whether an item is level. Additionally, the present disclosure also relates to a system and method of transferring dimensions from a space determining device to an electronic communication device having a software application useful for creating a template based on the captured dimensions for placement of an item or items within a target space.

To this end, in an embodiment of the present disclosure, a device for use in determination of spacing for mounting an item or object, is provided. The spacing device comprises a housing with an internal cavity, opposing adjustable arms, which are capable of extending from and retracting into the internal cavity of the housing, and a locking feature for locking and unlocking the arms into place for holding the desired dimensions, and which is useful for transferring dimensions from one location to another. The present device further includes at least one leveling feature incorporated into the housing of the device.

In another embodiment, a method of capturing a dimension is provided. The method includes the steps of providing a space determining device having a housing containing a pair of movable opposing arms connected to a rotatable alignment gear centered between and in engagement with the opposing arms, rotating the alignment gear through a knob on an outer surface of the housing, extending the opposing arms away from the housing through rotation of the knob and alignment gear to an opposing equal distance away from the housing, adjusting the extended opposing arms to a desired tension and, locking the extended opposing arms at the equal distance from the housing.

In another embodiment of the present disclosure, a system for use in determination of spacing, is provided. The system comprises an electronic communication device, a space determining device comprising, a housing, a pair of opposing arms disposed within the housing, the arms adapted for extending from and retracting into the housing, a circular alignment gear disposed within the housing between the arms, wherein the circular gear engages each of the opposing arms, a locking mechanism for locking and unlocking the arms for sliding the arms between an extended position and a retracted position, a processor disposed within the housing for receiving and transmitting measured dimensions between the space determining device and the electronic communication device.

It is, therefore, an advantage and objective of the present disclosure to provide a device useful for easily and quickly determining a center point to aid in placement and hanging an object.

It is further an advantage and objective of the present invention to provide a device for determination of proper placement of an item including spacing in relation to the center point.

It is yet another advantage of the present disclosure to provide a device incorporating various elements for leveling an object.

It is a further advantage and objective of the present disclosure to provide a device that locks onto desired dimensions for transferring the dimension from a template or project to where it will be placed, providing essentially a "measureless" transfer of spacing.

It is yet another advantage and objective of the present disclosure to provide a system and method of transferring dimensions from a space determining device to an electronic communication device, such as a smartphone, tablet, or other device having a software app useful for creating a template using the transferred dimensions for determining placement of an item or items within a target space.

Additional features and advantages of the present disclosure are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1 illustrates a perspective view of a space determining device of the present disclosure;

FIG. 1a illustrates a front view of the space determining device of the present disclosure;

FIG. 4 illustrates an interior view of the space determining device of the present disclosure, showing the central circular alignment gear adapted for engagement with the opposing arms, which are in the open, extended position;

FIG. 5 illustrates an embodiment of a space determining device incorporating a laser;

FIG. 7 illustrates a schematic diagram of an embodiment of a system and method of determining an arrangement of an object or objects in a target space using a software application;

FIG. 8 illustrates a schematic diagram of another embodiment of a system and method of determining an arrangement of an object or objects in a target space using an embodiment of the space determining device of the present disclosure.

DETAILED DESCRIPTION

Figure 2:
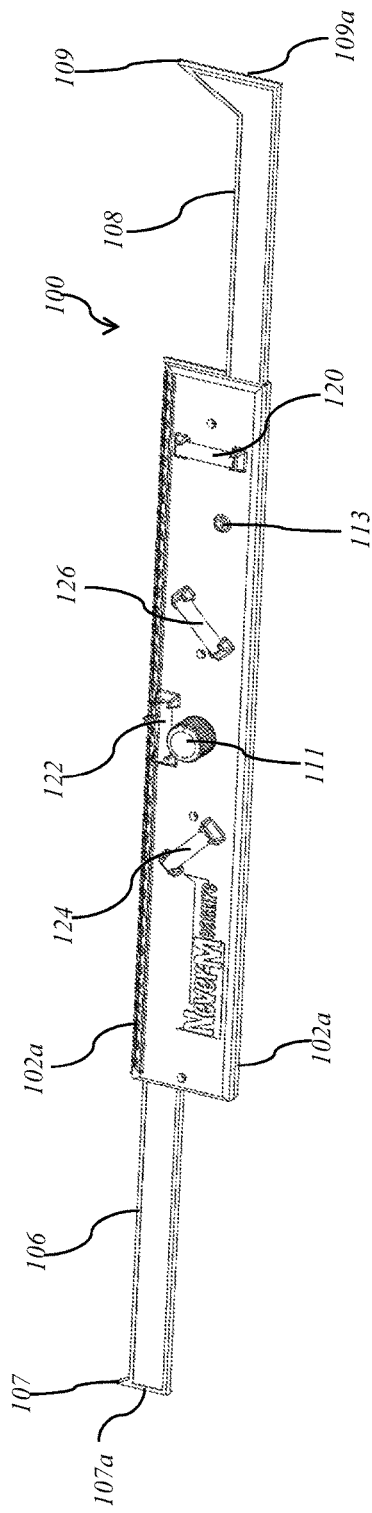
FIG. 2 illustrates a perspective view of the space determining device of the present disclosure with the opposing arms extended.

The present disclosure relating to a space determining device, which is useful for assisting in placement, mounting, hanging and leveling a picture, shelving, or any other object on a vertical surface, such as a wall. The present device is capable of determining a center point, and for providing accurate measurement and spacing from the center point for precise placement of an item. Additionally, the device is capable of determining and locking appropriate dimensions, thereby providing the ability to transfer dimensions from one position or location to another. The present disclosure also relates to a system and method for determining precise measuring, leveling and placement of objects onto a wall in a desired position. Additionally, the present disclosure also relates to a system and method of determining and transferring dimensions from a space determining device to an electronic communication device, including but not limited to, a laptop computer, smartphone, tablet, or other device, which is loaded with a software application used to create a template for placement of an item or items within a target space.

The present disclosure also relates to a space determining device that incorporates a laser, which is useful for determining a center point in larger space. Specifically, the laser may be used to determine a center point having the ability to determine equal spacing in opposite directions exceeding the length of the housing of the present space determining device. The laser can be incorporated within the housing of the space determining device, or offered as a separate, stand-alone unit that is attachable and detachable to the housing of the space determining device using know fastening mechanisms. A digital readout may be incorporated into the housing of the space determining device or on the laser itself.

The present disclosure also relates to a system and method of transferring dimensions from a space determining device to an electronic communication device, including but not limited to, a laptop computer, smartphone, tablet, or other device. The space determining device includes a processor and transceiver capable of obtaining and transmitting information, such as a series of dimensions or locations, to the electronic communication device. A software application or "app" loaded onto the appropriate electronic communication device would then be used, for example, to create a template, based on the dimensions, for positioning an item or plurality of items onto a target space.

Specifically, the structural features and operation of the present device permits accurate determination of a center point for hanging items or objects. Based on the center point, the device is capable of determining appropriate spacing and placement of items, including accurate spacing from the center point for fasteners, such as screws, nails or hooks. The device is also configured with a locking mechanism, which holds a measured dimension allowing for transfer of the determined dimension from one place or project to another place or project. For example, the present device 100 can be used to measure the inside surface of a drawer or cabinet. The device is laid flat and the movable arms opened to the desired width or length. After the desired dimensions are taken, the arms of the device can be locked to permit transfer of the determined dimensions of the inside surface with accuracy and consistency to another location.

Figure 3:
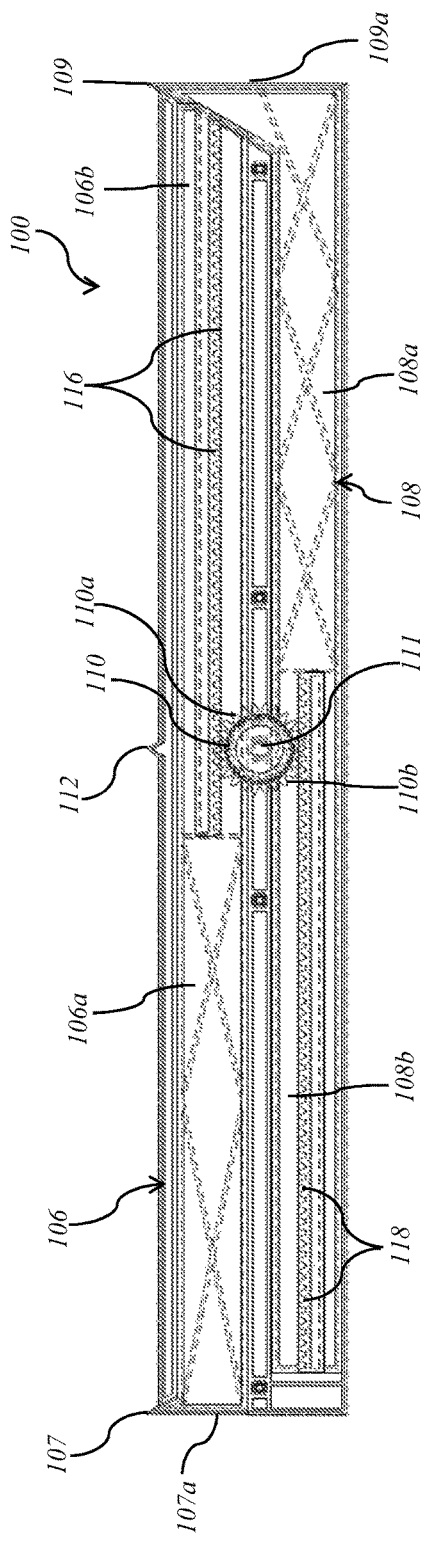
FIG. 3 illustrates an interior view of the space determining device of the present disclosure, showing a central circular alignment gear adapted for engagement with the opposing arms, which are in the closed, retracted position.
Figure 6:
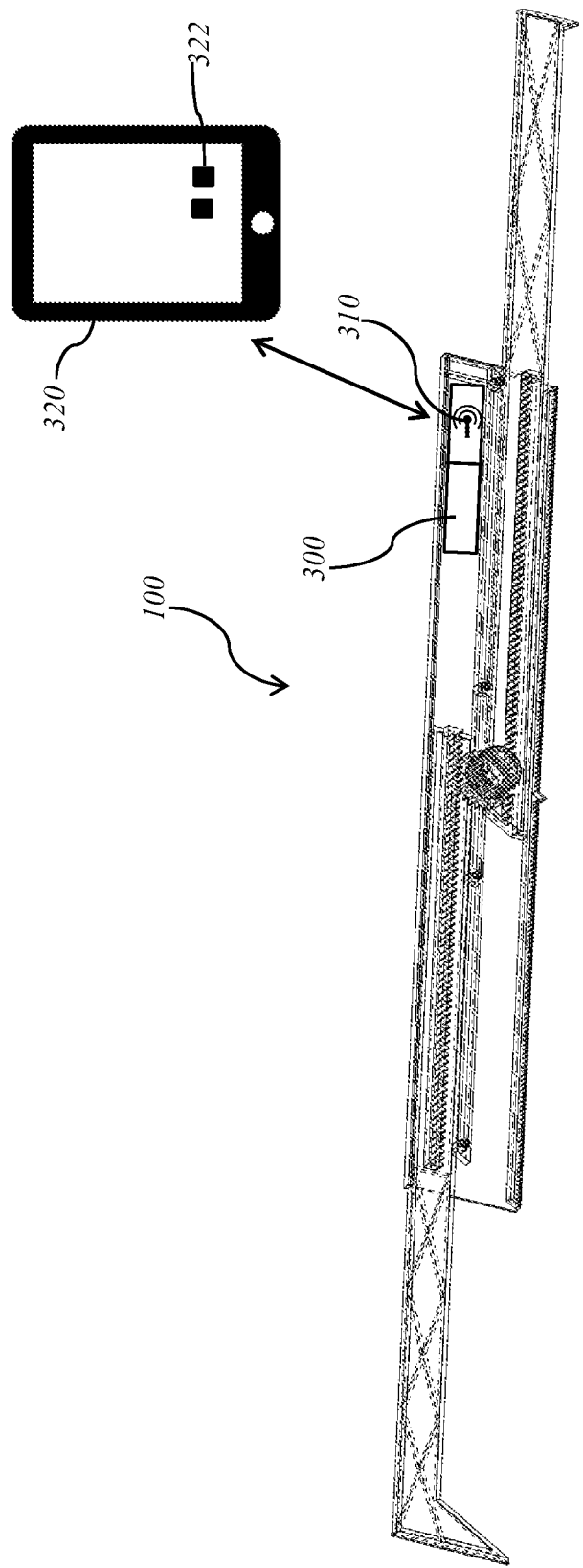
FIG. 6 illustrates an embodiment of a space determining device having a processor for communicating with an electronic communication device.

Now referring to the figures, wherein like numerals refer to like parts, FIG. 1 illustrates an embodiment of a space determining device 100 of the present disclosure. FIG. 1a illustrates a front view of the space determining device of the present disclosure in the closed position. FIG. 2 illustrates the space determining device of the present disclosure with opposing slidable arms extended. FIG. 3 illustrates an interior view of the space determining device, showing a central circular alignment gear adapted for engagement with the opposing arms, which are in the closed, retracted position. FIG. 4 illustrates an interior view of the space determining device of the present disclosure, showing the central alignment gear and the opposing arms in the open, extended position. FIG. 5 illustrates an embodiment of a space determining device incorporating a laser. FIG. 6 illustrates an embodiment of a space determining device having a processor and transceiver for communicating with an electronic communication device, such as a tablet, laptop computer or a smartphone. FIG. 7 illustrates a schematic diagram of an embodiment of a system and method of determining an arrangement of an object or objects in a target space using a software application. FIG. 8 illustrates a schematic diagram of another embodiment of a system and method of determining an arrangement of an object or objects in a target space using an embodiment of the space determining device of the present disclosure As shown in FIGS. 1-3, the space determining device 100 of the present disclosure includes a housing 102, generally having a square or rectangular configuration, which can be constructed from any suitable, durable material. The housing 102 includes an interior cavity 104, which is designed to receive slidable opposing arms, specifically a left arm 106 and a right arm 108. Optionally, the housing 102 includes a separate interior cavities to separately accommodate each arm. The device 100 further includes an alignment gear 110, which is centrally located within the interior of the housing 102, the alignment gear movable through a rotatable knob 111 positioned on an outer surface of housing. As will be described, the central alignment gear 110 engages the opposing arms, enabling extension of the arms from the housing 102, and retraction of the retracting the arms into the housing 102.

Once the desired extension length of the opposing arms 106, 108 is reached, a locking mechanism 113 is turned in one direction to tightening the arms while in the extended position thereby capturing the desired dimensions. One example of a locking mechanism 113 useful in the present disclosure is a locking thumb screw. However, it should be understood that any form of locking mechanism may be useful, including cam-style or gear device. The locking mechanism 113 can also be used to adjust the tension of the opposing arms 106, 108 particularly when the arms are in the expanded position outside of the housing 102 of the present device. Tensioning the expanded arms results in a more accurate reading of the dimension.

To aid in determining dimensions or spacing, the housing 102 includes a center point indicator 112 on an outer edge of the housing. The center point indicator 112 provides an auto centering feature, which is useful for easily determining the center of a space or item. Additionally, for determining spacing that is less than the length of the device 100, for example where extension of the arms 106, 108 is not required for determining a measurement, a plurality of gradient indicators 114 are disposed along an opposing outer edge of the housing 102 (FIG. 1a). The gradient indicators 114 are graduated centered at zero, and numbered equally in both the left and right directions allowing for alignment on equal numbers to self-center on zero. The gradient indicators 114 can also be used to assist in spacing irregularly shaped objects, such as letters or numbers, which otherwise would be difficult to properly space.

Many projects require the taking of dimensions from the center point 112 greater than the length of the housing 102 of the device 100. As illustrated in FIG. 2, the present space determination device 100 includes a left arm 106 and an opposing right arm 108. Each arm 106, 108 is movable, sliding between a retracted closed position within the respective interior cavity 104 of the housing 102, and an extended open position, outside of the housing where the arms are useful for determining dimensions. When the arms 106, 108 are fully retracted within the cavity 104 of the housing 102, the device 100 is presented in a compact storage position (FIG. 1). As shown in the embodiment of FIG. 2, the ends 107, 109 of the arms 106, 108 may be angled to create a closed compact end for storage when the arms are fully retracted into the housing 102. Additionally, as shown in FIGS. 2, 4 and 6, each end 107, 109 of the arms 106, 108 includes a raised lip 107a, 109a forming the outer edge of each arm. The raised lip 107a, 109a, allows the extended arms 106, 108 to stay in line with the housing 102 lying flat against a surface the housing is in contact with, rather than flexing or bending. In this manner, the extended arms 106, 108 are more stable providing a more accurate reading.

As shown in FIGS. 3 and 4, each arm 106, 108 includes a first section 106a, 108a, respectively, and a second section 106b, 108b, respectively. The first section 106a, 108a of each arm is extendable from the interior 104 of the housing 102. The second section 106b, 108b of each arm includes a plurality of teeth 116, 118 positioned along an outer edge of each arm. For example, the left arm 106 includes a plurality of teeth 116 along a bottom edge of the arm, while the right arm 108 includes a plurality of teeth 118 along a top edge of the arm. The teeth 116, 118 of each arm are designed to synchronously engage with a plurality of teeth 110a along an outer circumference of the central circular alignment gear 110. The second sections 106b, 108b of each arm remain within the interior 104 of the housing 102 even when the arms 106, 108 are fully extended completely outside the interior of the housing. When the arms 106, 108 are fully extended from the housing 102, they reach beyond the exterior perimeter 102a of the housing.

During operation of the device 100, the teeth 116 of second section 106b of the left arm 106 initially engage the teeth 110a along the top edge of the circular gear 110, while the teeth 118 of the second section 108b of the right arm 108 initially engage the teeth 110b along the opposing bottom edge of the alignment gear 110 (FIG. 3). Engagement of the teeth 116, 118 of each respective arm 106, 108 with the teeth 110a, 110b of the alignment gear 110 permit the arms to be moved in sync out of the housing for precise readings, or retracted completely into the housing for storage. When the rotatable knob 111 is turned in a first direction the circular gear 110 rotates and engages with the respective teeth 116, 118 of each arm 106, 108 simultaneously moving the arms in opposite directions away from one another out of the housing 102 (FIG. 4). When the rotatable knob 111 is turned in a second direction, the engaged circular gear 110 rotates and engages with the respective teeth 116, 118 of each arm thereby moving the arms toward one another for retraction into the interior 104 of the housing (FIG. 3).

When the arms 106, 108 (specifically the first section 106a, 108a of each arm) are extended outward from the interior of the housing 102, they are positioned an equal distance away from one another and from the center point 112, thereby providing an accurate measurement from the center point. The extension adjustability of the arms 106,108 allows for a plurality of dimensions to be taken and transferred, with ease and accuracy. The outward position of the arms 106, 108 can be locked into place through rotation of the locking mechanism 113 thereby capturing the desired dimension. Additionally, as previously mentioned, the locking mechanism 113 also adjusts the tension of the extended arms 106, 108, which allows for stability in the extended position, providing more accurate readings.

The device 100 further includes at least one leveling element 120, which is useful for determining whether an item is properly positioned in a level manner. In the embodiment shown in FIGS. 1, 2 and 5, four leveling elements—120, 122, 124, 126—are shown. For example, leveling element 120 is a vertical bubble level, leveling element 122 is a horizontal bubble level, and leveling elements 124, 126 are an angled bubble element. The bubble levels 120, 122, 124, 126 aid in leveling an object in the 90°, 180° and approximately 45° angles. Thus, the present device 100 provides the advantages of achieving precise, centered spacing, as well as, determining whether a placed object is level and balanced. It should be understood that any number of leveling elements, in any arrangement, may be incorporated onto the present device 100.

Other features useful for the measurement and placements of items may be incorporated into the present device. For example, as shown in FIG. 5, there is an embodiment of the space determining device 200 of the present disclosure incorporating a laser 210. The laser 210 may be positioned within the housing of the device 200, or it may be a separate device that can be attached and detached using know fasteners to and from the space determining device as needed. In use, the laser 210 may be useful for determining dimensions that are greater than the length of the housing and the extendable/retractable arms 106,108. The laser 210 may also include a digital readout 212, which would provide centering and numerical readings, plus and minus, for determining equal distance from a center point for hanging items both left and right, as the laser is shown onto the target space. In this manner, various dimensions may be taken assisting in the arrangement of individual to groups of items. Additionally, the laser 210 is useful for easily determining a center point, as the laser may be shown from either end of the device 200, providing a digital readout 212 of the target dimensions until the center point is determined.

The present device 100 is useful in a system and method for placement, mounting, hanging and leveling a picture, shelving, or any other object onto a receiving surface, such as a wall. In order to use the present device for hanging a picture, for example, the device 100 is placed against a wall in the desired position. Once the center point is determined, and rotating the circular center gear 110 through the thumb wheel 111, the opposing arms 106, 108 are simultaneously extended outward from the housing 102 of the device. Appropriate markings can be placed on the wall, where hanging elements, such as screws, nails or hooks will be placed. Further, the level of the markings can be determined using the appropriate leveling element 120, 122 or 124. The device 10 may also be used to check the level of the hung item using the appropriate leveling element.

The present device 100 has multiple uses for determining space and dimensions for a variety of possible projects, in addition to hanging objects. For example, the present device 100 is also useful for measuring the inside of a drawer or cabinet. The device 100 is placed down on the surface, such as the interior of a drawer and, as described above, the arms 106, 108 are extended outward to the appropriate dimension. Rotation of the locking mechanism 113 locks the arms 106, 108 into position, capturing the dimension. The device 100 is then removed from the drawer, and placed onto another surface, for example, liner paper which is to be used for the interior of the drawer. Based on the captured dimensions from the present device 100, the liner paper can then be cut to the appropriate dimension and placed within the drawer.

If a measurement involves a potential length that is shorter than the length of the device 100, such that extension of the arms 106, 108 is not required, the gradient indicators 114 disposed along a bottom edge of the housing 102 can be used to determine spacing. The gradient indicators 114 are graduated, centering at zero and numbered equally in both the left and right direction. In this manner, self-centering at zero is maintained.

Referring to FIG. 6, in yet another embodiment, the present device 100, 200 may include a processor 300, such as a printed circuit board, and a transceiver 310, such as a Bluetooth-enabled device, Wi-Fi enabled device, or any other form of communication protocol known in the art, which is capable of transmitting to and communicating with a separate electronic communication device 320. The electronic communication device 320 useful in the present disclosure includes, but is not limited to, a smartphone, laptop or tablet. For simplicity, a smartphone will be used as the example electronic communication device 320.

The smartphone 320 is loaded with a software application 322 or "app," which enables the dimensions captured by the space determining device 100, 200 to be transmitted through the transceiver 310 to the smartphone 320. For example, readings of various dimensions and/or locations of a target space may be taken using the expandable, adjustable arms 106, 108 as described earlier, or through use of a laser 210. These readings are then transmitted through the transceiver 310 from the space determining device 100, 200 to the smartphone 320. Using the app 322 on the smartphone 320, the dimensions and/or locations are loaded into a template provided by the app 322, which the user can view on the smartphone. The template enables the user to place an item or a plurality of items onto the target space based on the calculated dimensions, so the user can determine where to place the item or item within the target space.

Referring to FIG. 7, there is an exemplary embodiment of a system 400 of the present disclosure, using an electronic communication device 320, i.e., a smartphone, loaded with the app 322 for space determination. The smartphone case may include pointers, gradients or some other form of indicators to assist in measurements (not shown). The method 400 includes the steps of:

Step one 410—a user of a communication device 320, shown in this embodiment as a smartphone, activates an app 322 on the device indicated, for example, as "Nevermeasure Template" or "Find My Dimensions Template;"

Step two 412—using the app 322 on the smartphone 320 a first distance reading would be taken in one direction and recorded on the smartphone;

Step three 414—using the app 322 on the smartphone 320, the smartphone would then be rotated to a second direction and a second distance measurement taken in that new direction using the app;

Step four 416—the center point would be determined based on the center of rotation of the smartphone 320;

Step five 418—From the center point determination, a variety of dimensions could be taken of a target space and transmitted to the receiving smartphone 320.

Step six 420—Upon receipt of the dimensions, and center point reading, the software on the receiving smartphone 320 would then prepare a template for use in hanging the item or items.

Referring to FIG. 8, there is an exemplary embodiment of a system 500 of the present disclosure, using the combination of the electronic communication device 320 with a camera (as generally known in the art) that is loaded with the app 322, and the space determining device 100, 200. The system 500 includes the steps of:

Step one 510—the user of the smartphone 320 or other electronic communication device with a camera, takes a photograph of a target space intended for hanging an object or multiple objects;

Step two 512—images of the object or objects (such as front and back images) to be hung are taken with the same smartphone 320;

Step three 514—using the software app 322 loaded onto the smartphone 320, the images of the objects or objects are arranged and rearranged into different areas of the target space, until the desired arrangement is reached, thereby creating a template;

Step four 516—the template arrangement of the object or objects within the target space is transmitted back to the target space determining device 100, 200, which includes a processor and transmitter as previously described;

Step five 518—the space determining device 100, 200 is moved around by the user within the target space enabling the user to determine where to place fasteners in the desired location for placing the object or objects. The space determining device 100, 200 may incorporate a digital readout or a light or series of lights to indicate the proper positioning of the fasteners as the device is moved over the target space.

The space determining device 100, 200 of the present disclosure is designed to be an "all-in-one" tool. In that regard, additional features may be incorporated into the device 100, 200, which may be handy for positioning and placing items on a wall. For example, the device 100 may include a holder for a pencil or marker, which can be used to mark a spot for inserting a fastener for hanging a picture, for example. Alternatively, a tape dispenser, which would permit marking a chosen point with a piece of removable tape, rather than making a physical marking on the desired spot with a pencil.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. A device for use in determination of spacing, the device comprising:
   a housing;
   a pair of opposing arms positioned within an interior of the housing, the arms adapted for extending from the interior of the housing and retracting fully into the interior of the housing;
   a circular alignment gear disposed within the housing between the arms, wherein the circular gear engages each of the opposing arms; and,
   a locking mechanism for locking and unlocking the arms between an extended position and a retracted position, wherein the device further includes a rotatable knob positioned on an outer surface of the housing and connected to the alignment gear.

2. The device of claim 1, wherein the alignment gear further includes a plurality of teeth around a circumference of the alignment gear, the teeth capable of engagement with a plurality of teeth along an outer edge of each arm.

3. The device of claim 1, wherein the housing further includes a center point indicator along an outer edge of the housing.

4. The device of claim 3, wherein when the arms are capable of extension from the housing in an equal and opposing distance from one another and from the center point indicator.

5. The device of claim 1, wherein the locking mechanism is capable of adjusting tension of the opposing arms in the extended position.

6. The device of 1, wherein the housing further includes a plurality of gradient indicators disposed along an edge of the housing and equally positioned from the center point indicator.

7. The device of claim 1, wherein the device further includes at least one leveling element.

8. A device for use in determination of spacing, the device comprising:
   a housing;
   a pair of opposing arms positioned within an interior of the housing, the arms adapted for extending from the interior of the housing and retracting fully into the interior of the housing;
   a circular alignment gear disposed within the housing between the arms, wherein the circular gear engages each of the opposing arms;
   a locking mechanism for locking and unlocking the arms between an extended position and a retracted position; and,
   a laser disposed within the housing,
   wherein the laser is capable of determining a center point and a plurality of readings equal distance from the center point.

9. The device of claim 8, wherein the device further includes a rotatable knob positioned on an outer surface of housing for engagement with the alignment gear.

10. The device of claim 8, wherein the alignment gear further includes a plurality of teeth around a circumference of the alignment gear, the teeth capable of engagement with a plurality of teeth along an outer edge of each arm.

11. The device of claim 8, wherein the housing further includes a center point indicator along an outer edge of the housing.

12. The device of claim 11, wherein when the arms are capable of extension from the housing in an equal and opposing distance from one another and from the center point indicator.

13. The device of 8, wherein the housing further includes a plurality of gradient indicators disposed along an outer edge of the housing and equally positioned from the center point indicator.

14. A system for use in determination of spacing, the system comprising:
- an electronic communication device;
- a space determining device comprising:
  - a housing;
  - a pair of opposing arms disposed within an interior of the housing, the arms adapted for extending from within the interior of the housing and retracting completely into the interior of the housing;
  - a circular alignment gear disposed within the interior of the housing between the arms, wherein the circular gear engages each of the opposing arms;
  - a locking mechanism for locking and unlocking the arms for sliding the arms between an extended position and a retracted position, the locking mechanism capable of adjusting tension of the arms in the extended position;
  - a processor disposed within the housing for receiving and transmitting measured dimensions between the space determining device and the electronic communication device.

15. The system of claim 14, wherein the space determining device further includes a transceiver capable of transmitting measured dimensions from the space determining device to the electronic communication device.

16. The system of claim 15, wherein the electronic communication device further incorporates a software application for designing a template based on transferred dimensions from the space determining device.

17. The system of claim 16, wherein the template is useful for placing at least one item in a target space.

18. The system of claim 14, wherein the space determining device further includes a least one leveling element.

* * * * *